United States Patent [19]

Rademachers et al.

[11] Patent Number: 4,917,735

[45] Date of Patent: Apr. 17, 1990

[54] PROCESS FOR THE PRODUCTION OF RUTILE MIXED-PHASE PIGMENTS

[75] Inventors: Jakob Rademachers; Hans-Peter Heisse, both of Krefeld, Fed. Rep. of Germany

[73] Assignee: Bayer Aktiengesellschaft, Leverkusen, Fed. Rep. of Germany

[21] Appl. No.: 298,602

[22] Filed: Jan. 18, 1989

[30] Foreign Application Priority Data

Jan. 28, 1988 [DE] Fed. Rep. of Germany ....... 3802468

[51] Int. Cl.$^4$ ................................................ C09C 1/36
[52] U.S. Cl. ..................................... 106/428; 106/436
[58] Field of Search ................................. 106/428, 436

[56] References Cited

U.S. PATENT DOCUMENTS

| | | | |
|---|---|---|---|
| 3,022,186 | 2/1962 | Humd et al. ......................... | 106/428 |
| 3,560,234 | 2/1971 | Holbein ................................ | 106/428 |
| 3,607,338 | 9/1971 | Webb ................................... | 106/428 |
| 3,942,999 | 3/1976 | Hinley ................................. | 106/428 |
| 4,448,608 | 5/1984 | Jenkins ............................... | 106/428 |

FOREIGN PATENT DOCUMENTS 1541979 3/1979 United Kingdom .

OTHER PUBLICATIONS

Ullmanns Encyklopadie der Technischen Chemie, Petrolsulfonate bis Plutonium Band 18, pp. 576.

*Primary Examiner*—Peter D. Rosenberg
*Attorney, Agent, or Firm*—Sprung Horn Kramer & Woods

[57] ABSTRACT

A process for the production of rutile mixed-phase pigments comprising calcinating a solid mixture of titanium dioxide and/or titanium dioxide hydrate with a dye-producing metal compound in an indirectly heated rotary kiln supplied with air, wherein the titanium dioxide comprises an uncalcined, salt-free titanium dioxide having a specific BET surface of 50 to 500 m$^2$/g.

9 Claims, No Drawings

PROCESS FOR THE PRODUCTION OF RUTILE MIXED-PHASE PIGMENTS

BACKGROUND OF THE INVENTION

1. Field of the Invention

This invention relates to a process for the production of rutile mixed-phase pigments by calcination of solid mixtures of titanium dioxide and/or titanium dioxide hydrate with dye-producing metal compounds, particularly of chromium and/or nickel, optionally with addition of compounds of antimony, niobium or tungsten, in an indirectly heated rotary kiln to which air is supplied.

2. Background Information

Rutile mixed-phase pigments are known from DE-A-12 87 236. These known pigments are colored pigments which are obtained by incorporation of colored transition elements in the crystal lattice of the rutile. Metals such as these are predominantly incorporated as guest component in the host lattice of the rutile, of which the cation radii are of the order of the radius of the titanium-(IV) ion. If the valency of the cation to be incorporated differs from that of the titanium ion, namely four, another cation having a different valency is added for statistical valency equalization.

Nickel and chromium rutile mixed-phase pigments have acquired considerable significant for large-scale production. In their case, oxides of relatively high valency, particularly antimony oxide and less frequently niobium or tungsten oxide, are incorporated for valency equalization with the chromophoric nickel and chromium nickel (Ullmanns Encyklopädie der technischen Chemie, Verlag Chemie GmbH, Wienheim 1979, 4th Edition, Vol. 18, page 608).

The mixed phase pigments with a rutile lattice are produced by calcination of homogeneous mixtures of titanium dioxide as the host component and the chromophoric guest components at temperatures of up to 1200° C. Instead of oxidic guest components, heat-sensitive compounds of the metals on which the components are based may also be mixed with titanium dioxide, titanium hydroxide or titanium dioxide hydrate, changing on heating in air into the corresponding oxides, for example, hydrates, hydroxides, carbonates, acetate, nitrates or formates.

The raw material mixtures are usually calcined in rotary kilns which may be either directly or indirectly heated. Where the rotary kilns are directly heated, the starting material is best an aqueous suspension containing the starting components, which largely avoids solids being discharged from the kiln with the smoke gases. Where dry mixtures of the starting components are used, it is better to use indirectly heated kilns because, in their case, the quantity of waste gas can be more or less considerably reduced, depending on the starting materials, so that there is no danger of a high discharge of solids.

DE-A-30 19 172 describes one such process for the production of rutile mixed-phase pigments. The advantage of this process over earlier processes is said to lie in the economy of the fully continuous rotary-kiln process for the calcination step.

To achieve the advantages of the process, a relatively long rotary kiln with a length-to-diameter ratio of 20:1 has to be installed. Apart from the fact that relatively long indirectly heated rotary kilns, which are heated to temperatures of up to about 1200° C., as measured in the product to be calcined, are fairly difficult to construct and operate, they do of course show greater irradiation losses than shorter kilns of the same capacity.

In another embodiment of the process, air is supplied to the kiln in co-current with the material to be calcined, because countercurrent operation, which is of greater advantage in terms of energy, gives products of no real value.

It is already known that titanium dioxide hydrate, also known as titanium oxide hydroxide or metatitanic acid, can be used in the production of rutile mixed phases (DE-A26 05 651).

The suspension obtained from the hydrolysis of titanium or digestion solutions in sulfuric acid after filtration and washing, with solids contents of around 305 by weight, is used in this process. The titanium dioxide hydrate in this aqueous suspension, which usually accumulates in the form of a paste or a filter cake, has a low pH value of around 1 to 2 and still contains considerable quantities of bound sulfuric acid of the order of 5 to 10% by weight which cannot be washed out (Ullmanns Encyklopadie der technischen Chemie, Vol. 18, 1979, page 576, column 1).

The disadvantage of this titanium-containing material as a starting material for the rutile mixed-phase pigments is that the sulfuric acid is released only on calcination. However, this creates an increased risk of corrosion in the rotary kiln. In addition, considerable expense is involved in treating the waste gases.

In addition, the use of these titanium compounds does not lead to improved rutile mixed-phase pigments. The use of calcined anatase is also known from DE-A-11 36 041, but does not lead to the required pigment quality.

SUMMARY OF THE INVENTION

The object of the present invention is to provide an improved process for the production of rutile mixed-phase pigments which does not have any of the disadvantages described above.

It has now surprisingly been found that these requirements are satisfied by a process for the production of rutile mixed-phase pigments by calcination of solid mixtures of titanium dioxide and/or titanium dioxide hydrate with dye-producing metal compounds, particularly of chromium and/or nickel, optionally with addition of compounds of antimony, niobium or tungsten, in an indirectly heated rotary kiln to which air is supplied, characterized in that an uncalcined salt-free titanium dioxide having a specific BET surface of from 50 to 500 $m^2/g$ and preferably from 250 to 350 $m^2/g$ is completely or partly used as the titanium component in the starting mixture.

DETAILED DESCRIPTION OF THE INVENTION

The addition of the titanium dioxide according to the invention, which may be obtained by neutralization, washing and drying of titanium dioxide hydrate, affords the advantages according to the invention in the calcination step for the production of rutile mixed-phase pigments in an indirectly heated rotary kiln. These advantages lie in a reduction in the residence time through an accelerated reaction and, hence, an increase in the capacity of the rotary kiln, even where it has a smaller length-to-diameter ratio than 20:1, for example from 5 to 10:1.

The finely divided titanium dioxide is advantageously produced by neutralization of the titanium dioxide hydrate accumulating as intermediate product in the manufacture of titanium dioxide pigment with sodium hydroxide, washing and thickening on a crossflow filter and drying at a maximum temperature of 150° C. in a spray dryer.

A finely divided titanium dioxide of this type is commercially obtainable as "Bayertitan PK 5585" (a product of Bayer Ag). It is a free-flowing product having a $TiO_2$ content of 89 to 92% by weight, corresponding to an ignition loss of 8 to 11% by weight, a pH value of 5.5 to 6.5, a crystallite size of the order of 0.01 μm and a specific BET surface of 250 to 350 $m^2/g$ (as measured in accordance with DIN 66 131, Section 6, October 1973: 5-point method, measuring gas nitrogen, adsorption at the temperature of boiling nitrogen, surface required by one nitrogen molecule taken as 0.162 $nm^2$, pretreatment: heating for 1 hour in a stream of nitrogen at 130° C.). The $Na_2O$ content is below 0.1% by weight and the sulfate content below 0.6% by weight.

Accordingly, a finely divided titanium dioxide which has a pH value of 5 to 7 and an ignition loss of at most 12% by weight is preferably used in accordance with the invention.

Surprisingly, the addition is only effective where dry starting mixtures are used. No advance could be obtained in aqueous suspensions or pastes of the raw-material mixtures. The quantities added show an optimal effect in regard to calcination behavior and pigment quality when they are in the range from about 5 to 50% by weight and preferably in the range from 10 to 20% by weight, based on the total titanium dioxide content. Smaller additions produce inadequate effects. Larger additions give clinkers having a very low apparent density of from 0.3 to 0.4 kg/l which involve the danger of discharge from the rotary kiln with the air introduced. 10 to 20% by weight of the total titanium dioxide used is preferably supplied by the finely divided titanium dioxide added.

For a comparable kiln capacity or for twice the kiln capacity, the process according to the invention gives a soft clinker which, in contrast to the usual, very expensive wet grinding, may be dry-ground equally well in standard pigment mills.

Uniform, readily granulated, non-dusting clinkers leading to color-pure pigments of high quality are also obtained in the countercurrent process—more favorable in terms of energy—by the supply of air from the product discharge side of the rotary kiln.

The following Example is intended to illustrate the process according to the invention without limiting it in any way.

EXAMPLE 1

An indirectly heated rotary kiln with three heating zones and a rotating tube of heat-resistant metal (length 2 m, diameter 30 cm, rotational speed 5 r.p.m., inclination 1%) provided with a 5 cm tall overflow weir was charged with 5 kg/h of a homogenous mixture of the following composition:

74.6% by weight Bayertitan A* (=anatase)
9.2 % by weight Bayertitan PK 5585* (=finely divided anatase)
4.8% by weight chromium oxide CN*
11.4% by weight antimony(III) oxide The highest temperature in the product was kept at 1040° C. 1.5 $m^3/h$ air was supplied to the end of the kiln on the material discharge side. A reduced pressure of 0.1 to 0.3 mbar below atmospheric pressure was maintained by means of the waste-gas fan. A product of uniform color granulated to 3 mm (apparent density 0.77 kg/l) was obtained as clinker. A specific kiln output of 35 $kg/m^3$.h was calculated from the amount of clinker accumulating (approximately 4.9 kg/h). After discharge from the rotary kiln, the clinker was cooled and ground. A color-pure light yellow pigment with good saturation and strength of color was obtained.

EXAMPLE 2 (Comparison Example)

5 kg/h of a homogenous mixture of
83.7% by weight of Bayertitan A*
4.8% by weight chromium oxide GN*
11.5% by weight antimony(III) oxide
* Products of Bayer AG.

were introduced into the kiln described in Example 1. The other conditions were the same as in Example 1. The clinker obtained had an apparent density of 0.95 kg/l. An unsatisfactory yellow pigment much darker and dirtier than the pigment of Example 1 was obtained after grinding. It was only when the quantity of starting mixture introduced was reduced to 2.5 kg/h that an equally light, but somewhat less saturated pigment could be obtained (apparent density 0.9 kg/l). The specific kiln output worked out at 17.7 $kg/m^3$.h for a kiln capacity of 141 l.

It will be appreciated that the instant specification and claims are set forth by way of illustration and not limitation, and that various modifications and changes may be made without departing from the spirit and scope of the present invention.

What is claimed is:

1. A process for the production of rutile mixed-phase pigments comprising calcinating a solid mixture of titanium dioxide or titanium dioxide hydrate or titanium dioxide and titanium dioxide hydrate with a dye-producing metal compound in an indirectly heated rotary kiln supplied with air, wherein the titanium dioxide comprises an uncalcined, salt-free titanium dioxide having a specific BET surface of 50 to 500 $m^2/g$.

2. A process as claimed in claim 1, wherein the dye-producing metal compound is selected from the group consisting of chromium, nickel and a mixture thereof.

3. A process as claimed in claim 1, which further comprises adding during the calcining a compound selected from the group consisting of antimony, niobium and tungsten.

4. A process as claimed in claim 1, wherein the specific BET surface is 250 to 350 $m^2/g$.

5. A process as claimed in claim 1, wherein the titanium dioxide comprises finely divided titanium dioxide in an amount of from 5 to 50% by weight based on the weight of the total titanium dioxide.

6. A process as claimed in claim 1, wherein the amount of finely divided titanium dioxide is 10 to 20% by weight.

7. A process as claimed in claim 1, wherein said titanium dioxide has a pH value of 5 to 7 and an ignition loss of at most 12% by weight.

8. A process according to claim 7, wherein the pH is 5.5 to 6.5 and the ignition loss is 8 to 11% by weight.

9. A process as claimed in claim 1, wherein the air flows countercurrently with respect to the flow of solids.

* * * * *